United States Patent
Johnston, Jr. et al.

(10) Patent No.: US 10,929,940 B1
(45) Date of Patent: Feb. 23, 2021

(54) CONTROLLED-ENVIRONMENT FACILITY MESSAGE RESPONSE SYSTEM

(71) Applicant: Securus Technologies, Inc., Carrollton, TX (US)

(72) Inventors: Kenneth D. Johnston, Jr., Wylie, TX (US); John Mannewitz, Wylie, TX (US)

(73) Assignee: Securus Technologies, LLC, Carrollton, TX (US)

( * ) Notice: Subject to any disclaimer, the term of this patent is extended or adjusted under 35 U.S.C. 154(b) by 120 days.

(21) Appl. No.: 15/910,438

(22) Filed: Mar. 2, 2018

(51) Int. Cl.
*G06Q 50/26* (2012.01)
*H04L 12/58* (2006.01)

(52) U.S. Cl.
CPC ........... *G06Q 50/26* (2013.01); *H04L 51/046* (2013.01)

(58) Field of Classification Search
CPC .............................. G06Q 50/26; H04L 51/046
See application file for complete search history.

(56) References Cited

U.S. PATENT DOCUMENTS

| | | | | |
|---|---|---|---|---|
| 8,929,525 B1 * | 1/2015 | Edwards | ................. | H04N 7/147 379/114.21 |
| 9,094,569 B1 * | 7/2015 | Humphries | ............... | H04N 7/14 |
| 9,491,291 B1 * | 11/2016 | Apple | .................. | G06Q 30/016 |
| 9,558,332 B1 * | 1/2017 | Keiser | ..................... | G06F 21/31 |
| 9,558,523 B1 * | 1/2017 | Hodge | ................... | G06Q 50/26 |
| 10,192,070 B1 * | 1/2019 | Hodge | ..................... | G06F 21/32 |
| 2006/0184544 A1 * | 8/2006 | Harper | ................. | G06Q 20/382 |
| 2007/0003026 A1 * | 1/2007 | Hodge | .................. | H04M 3/533 379/88.1 |
| 2008/0201158 A1 * | 8/2008 | Johnson | .............. | H04M 3/2281 705/1.1 |
| 2008/0260118 A1 * | 10/2008 | Lyle | ....................... | H04M 3/533 379/88.23 |
| 2012/0281058 A1 * | 11/2012 | Laney | .................... | H04N 7/147 348/14.03 |
| 2014/0218466 A1 * | 8/2014 | Bloms | .................... | H04N 7/152 348/14.09 |
| 2015/0124947 A1 * | 5/2015 | Lefar | ...................... | H04L 51/24 379/88.13 |
| 2016/0300193 A1 * | 10/2016 | Halko | ................ | G06Q 10/1097 |

\* cited by examiner

*Primary Examiner* — Joe Chacko
(74) *Attorney, Agent, or Firm* — Fogarty LLP

(57) ABSTRACT

A resident of a controlled-environment facility is provided with a messaging service that includes a capability that provides a message recipient with reply message capabilities. A visitation request system receives requests for communication sessions between residents and non-residents. The visitation system initiates a request for a communication session on behalf of the requesting party and determines that the responding party has not accepted the communication session request. Since the request has not been accepted, a messaging service provides the requesting with an interface for recording a message for delivery to the responding party. If the requesting party records a message, the responding party is notified of the recorded message. Once the responding party plays the recorded message, the responding party is provided an option to record a reply message for delivery to the requesting party. The requesting party is notified of the reply message from the responding party.

20 Claims, 5 Drawing Sheets

CONTROLLED-ENVIRONMENT FACILITY MESSAGE RESPONSE SYSTEM

TECHNICAL FIELD

The following description relates generally to communication services provided to residents of a controlled-environment facility, and more particularly to messaging services provided to residents of a controlled-environment facility.

BACKGROUND OF THE INVENTION

It is estimated that over two million individuals are incarcerated in U.S. prisons and jails. In general, inmates that have been convicted of felony offenses serve longer sentences in prisons (e.g., federal or state prisons), whereas inmates that have been convicted of misdemeanors receive shorter sentences that are frequently served in local jails (e.g., county jail). In addition, upon being detained by authorities, an inmate may serve significant periods of time incarcerated in a local jail while awaiting release on bond and, in some cases, while awaiting trial. During all of these periods of incarceration, an inmate may be provided with opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide various types of remote communications sessions as visitation sessions, including voice and video conferences, text communications, email and online chat sessions.

Because many controlled-environment facilities do not allow residents to receive incoming communications in any form except for traditional mail, the communication services provided to residents of controlled-environment facilities typically limit residents to placing outbound communications session requests to non-residents of the controlled-environment facility. In addition, residents may have limited access to communication devices that may be used for requesting a communication session. For instance, a resident may be provided limited access to a communication device according to strict visitation schedules maintained by each individual controlled-environment facility. In some scenarios, communication sessions between a resident and a non-resident may be scheduled for a time when the resident will have access to a communication device, but the non-resident must also be available during this window in order for a communication session to be conducted.

In many instances, providing a communication session between a resident and non-resident depends on the non-resident being available to receive the resident's communication request at a time the resident is afforded the opportunity to initiate such a request. Consequently, in many instances, a resident's communication request is unsuccessful due to the inability of the non-resident to accept the resident's communication request. In scenarios where a resident is unable to establish a visitation session with a non-resident, certain controlled-environment facilities provide residents with the ability to record a voice, video or and/or text message that can be retrieved and played by the non-resident.

Messaging provides an additional communication mechanism for residents, but still leaves the resident dependent on the next scheduled communication session to initiate another request for a communication session with the non-resident in order to receive any kind of response to the message recorded for the non-resident. This may result in long delays in the messaging cycle between a resident and a non-resident. Residents of controlled-environment facilities benefit from shorter messaging cycles that allow residents to more quickly receive responses to messages because shorter messaging cycles tend to mitigate stress that may otherwise result in residents being involved in deleterious incidents.

BRIEF SUMMARY

According to various embodiments, a system provides a resident of a controlled-environment facility with messaging. The system includes a visitation request system configured to: initiate a first communications request on behalf of the resident for a first communications session with a non-resident; and determine that the non-resident has not accepted the first communications request. The system also includes a message service configured to: store a message recorded by the resident for the non-resident, in response to determining the first communications request has not been accepted by the non-resident; notify the non-resident of the recorded message from the resident; in response to a request to access the recorded message from the non-resident, play the recorded message for the non-resident; upon completing the playing of the recorded message, record a reply message from the non-resident; and notify the resident of the recorded reply message from the non-resident.

In certain additional embodiments of the system, the message service is further configured to prompt the non-resident to record the reply message, wherein the recorded reply message is limited to a first duration. In certain additional embodiments of the system, the first duration is determined based on a security classification associated with the resident. In certain additional embodiments, the system further includes a monitoring service configured to: analyze the recorded messages from the resident to identify indicators of unauthorized activity by the resident; and denote the recorded message as suspicious based on the identification of indicators of unauthorized activity by the resident. In certain additional embodiments of the system, the monitoring service is further configured to analyze the reply message for indicators of unauthorized reply activity by the non-resident, if the recorded message is denoted as suspicious. In certain additional embodiments of the system, the message service is further configured to receive a request from the resident to play the reply message from the non-resident, wherein the request is received from a resident device utilized by the resident; and convert the reply message from a first format to a second format based on the capabilities of the resident device.

According to various embodiments, a method provides a resident of a controlled-environment facility with messaging. The method includes: initiating, on behalf of the resident, a communications request for a communications session with a non-resident; determining that the non-resident has not accepted the communications request; in response to determining the first communications request has not been accepted by the non-resident, storing a message recorded by the resident for the non-resident; notifying the non-resident of the recorded message from the resident; in response to a request to access the recorded message from the non-resident, playing the recorded message for the non-resident; upon completing the playing of the recorded message, recording a reply message from the non-resident; and notifying the resident of the recorded reply message from the non-resident.

In certain additional embodiments, the method also includes prompting the non-resident to record the reply message, wherein the recorded reply message is limited to a first duration. In certain additional embodiments of the method, the first duration is determined based on a security classification associated with the resident. In certain additional embodiments, the method also includes: analyzing the recorded messages from the resident to identify indicators of unauthorized activity by the resident; and denoting the recorded message as suspicious based on the identification of indicators of unauthorized activity by the resident. In certain additional embodiments, the method also includes analyzing the reply message for indicators of unauthorized reply activity by the non-resident, if the recorded message is denoted as suspicious. In certain additional embodiments, the method also includes: receiving a request from the resident to play the reply message from the non-resident, wherein the request is received from a resident device utilized by the resident; and converting the reply message from a first format to a second format based on the capabilities of the resident device.

According to various embodiments, a computer-readable storage device having program instructions stored thereon provides a resident of a controlled-environment facility with messaging. Upon execution by one or more processors, the program instructions cause the one or more processors to: initiate, on behalf of the resident, a communications request for a communications session with a non-resident; determine that the non-resident has not accepted the communications request; in response to determining the first communications request has not been accepted by the non-resident, store a message recorded by the resident for the non-resident; notify the non-resident of the recorded message from the resident; in response to a request to access the recorded message from the non-resident, play the recorded message for the non-resident; upon completing the playing of the recorded message, record a reply message from the non-resident; and notify the resident of the recorded reply message from the non-resident.

In certain additional embodiments, the program instructions further cause the one or more processors to prompt the non-resident to record the reply message, wherein the recorded reply message is limited to a first duration. In certain additional embodiments of the computer-readable storage device, the first duration is determined based on a security classification associated with the resident. In certain additional embodiments, the program instructions further cause the one or more processors to: analyze the recorded messages from the resident to identify indicators of unauthorized activity by the resident; and denote the recorded message as suspicious based on the identification of indicators of unauthorized activity by the resident. In certain additional embodiments, the program instructions further cause the one or more processors to: analyze the reply message for indicators of unauthorized reply activity by the non-resident, if the recorded message is denoted as suspicious. In certain additional embodiments, the program instructions further cause the one or more processors to: receive a request from the resident to play the reply message from the non-resident, wherein the request is received from a resident device utilized by the resident; and convert the reply message from a first format to a second format based on the capabilities of the resident device. In certain additional embodiments of the computer-readable storage device, the first format is a text message format and the second format is an audio message format.

BRIEF DESCRIPTION OF THE DRAWINGS

Figure 1:
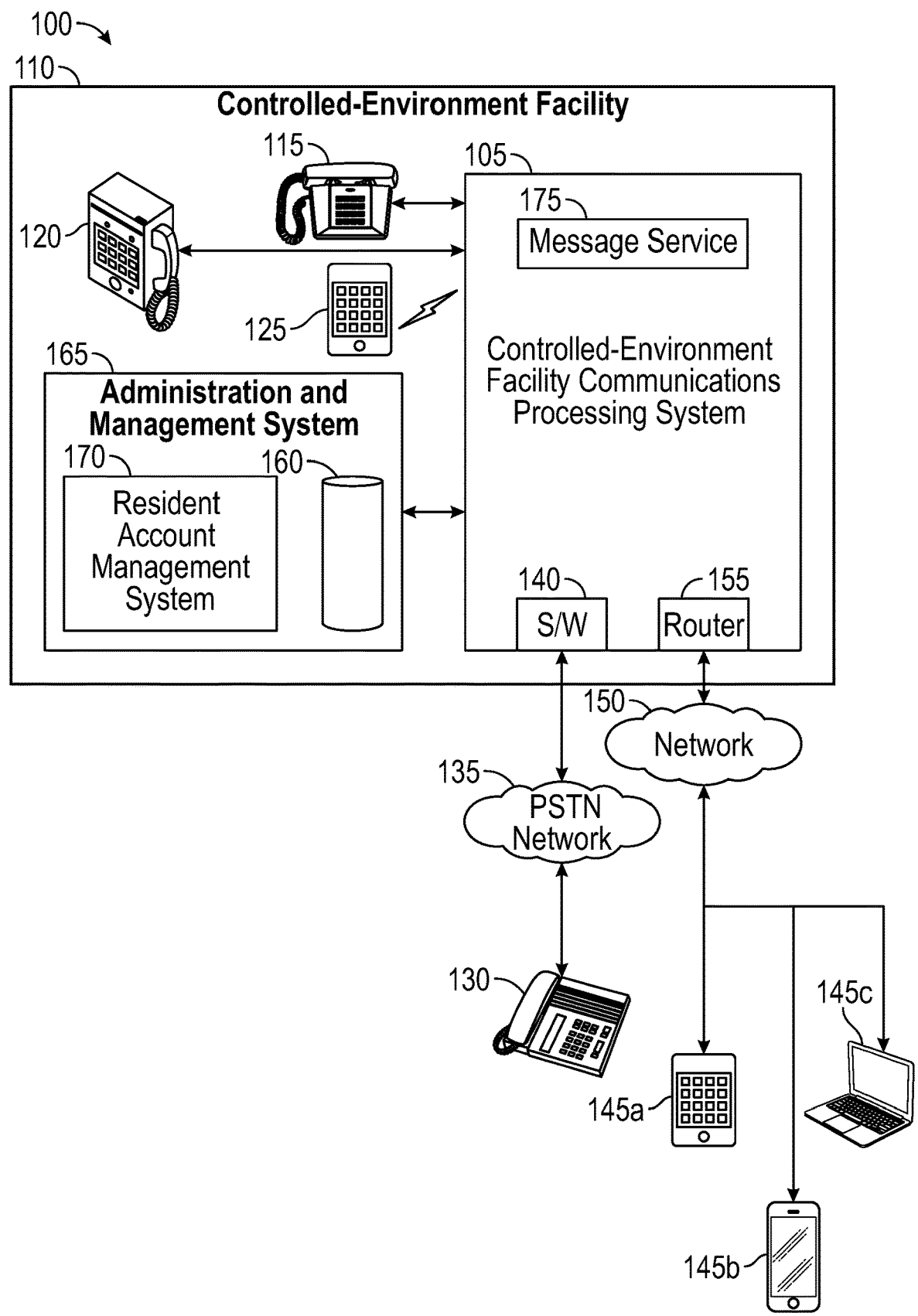

Having thus described the invention in general terms, reference will now be made to the accompanying drawings, which are not necessarily drawn to scale, and wherein:

FIG. 1 is a diagram illustrating certain components of a communication system for providing residents of a controlled-environment facility with messaging services according to various embodiments.

Figure 2:
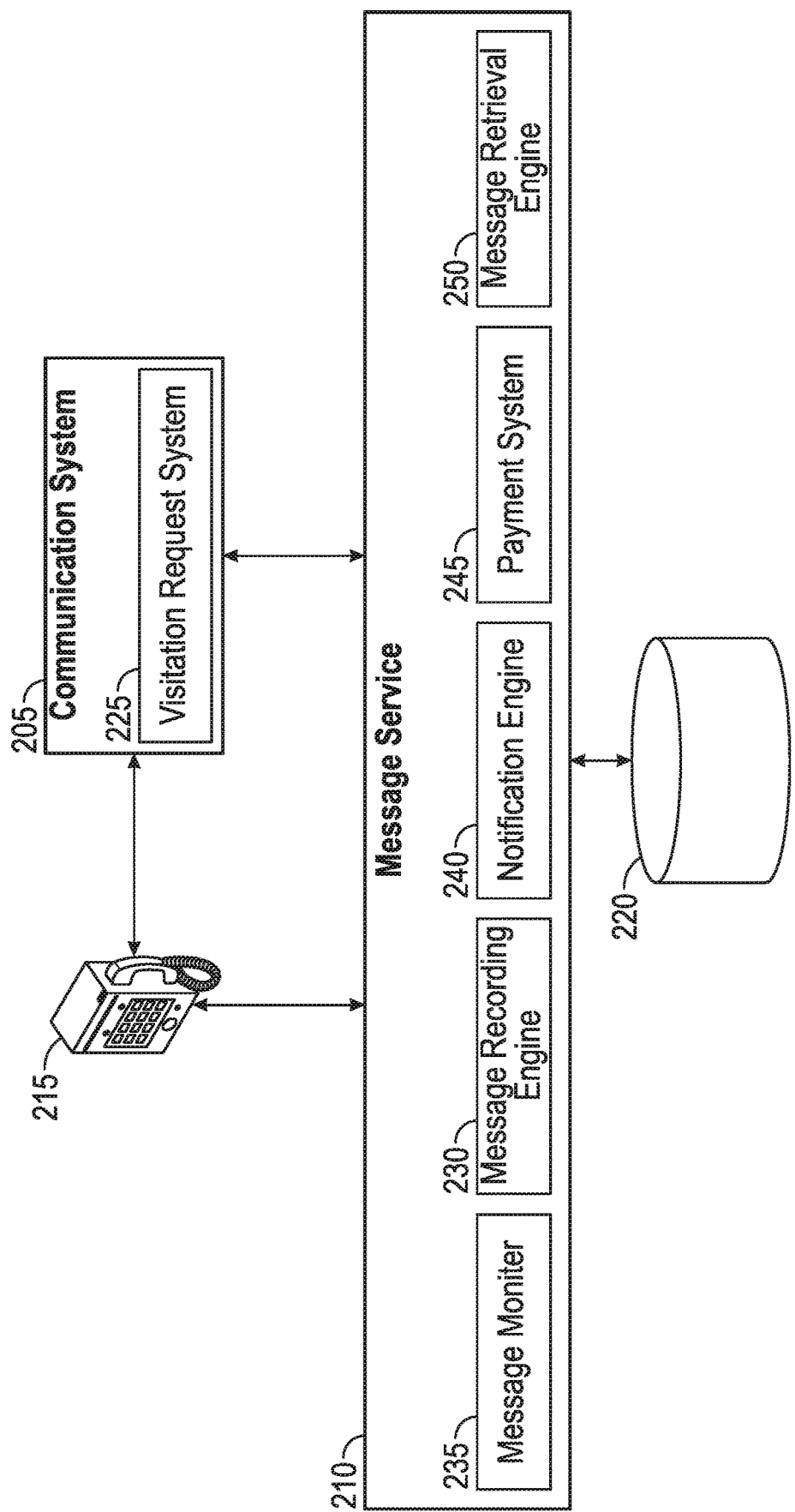

FIG. 2 is a diagram illustrating certain additional components of a system for providing residents of a controlled-environment facility with messaging services according to various embodiments.

Figure 3:
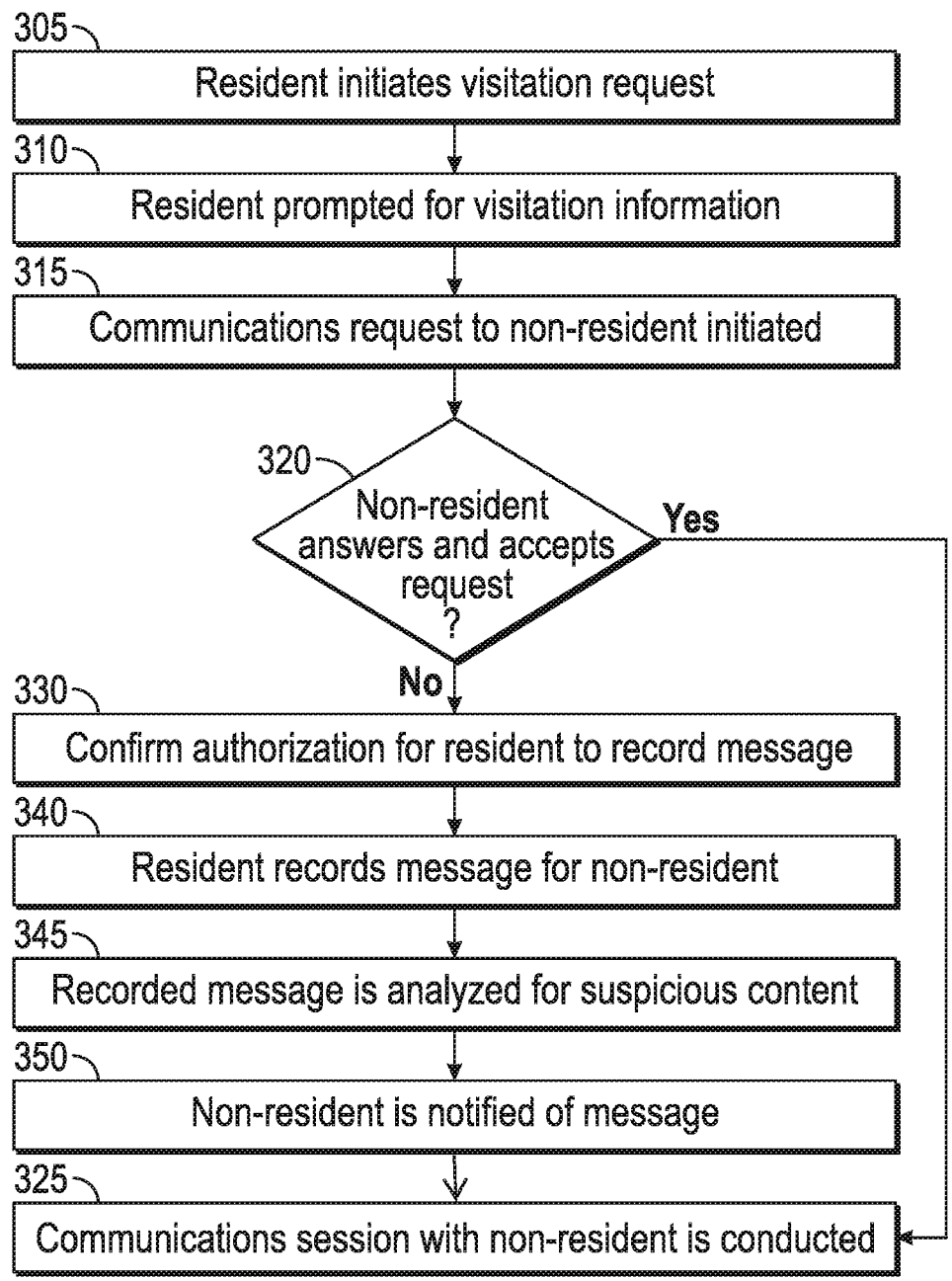

FIG. 3 is a flowchart diagram illustrating certain steps of process according to various embodiments for providing a resident of a controlled-environment facility with a message service.

Figure 4:
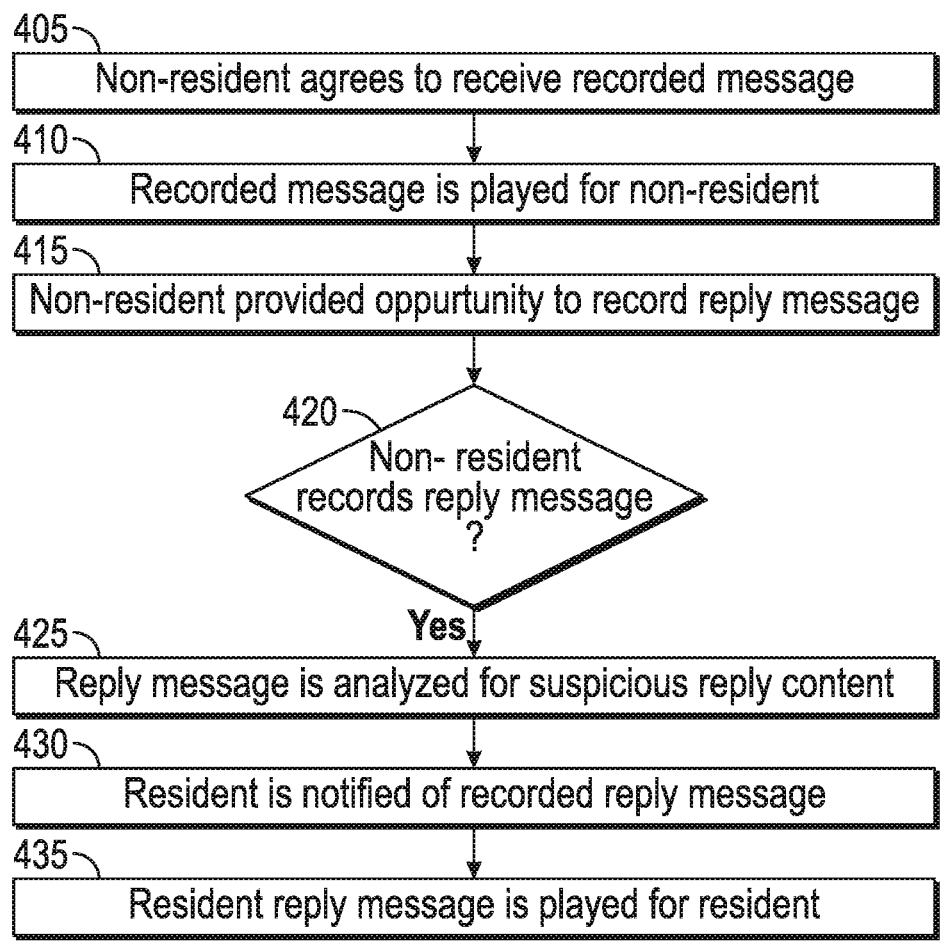

FIG. 4 is a flowchart diagram illustrating certain additional steps of process according to various embodiments for providing a resident of a controlled-environment facility with a reply message service.

Figure 5:
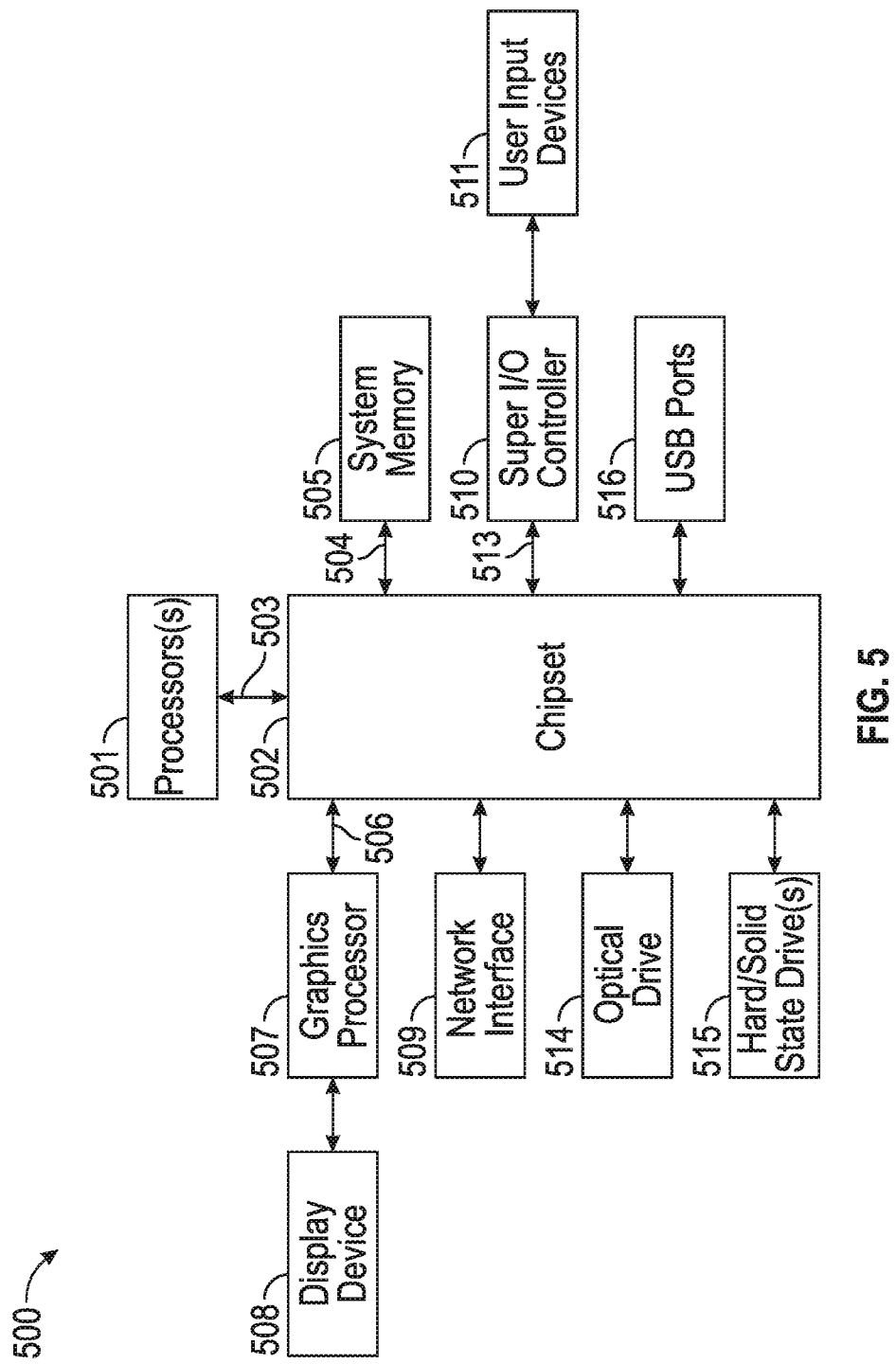

FIG. 5 is a block diagram illustrating certain components of a communication processing system used to implement a message service in a communication system according to various embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, offenders or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagram illustrating certain components of a communications system 100 provided within a controlled-environment facility 110 according to various embodiments.

As illustrated, the communications system 100 includes a communications processing system 105. In a controlled-environment facility 110, the communications processing system 105 may be a system that provides inmates with multiple different communications services. For instance, communications processing system 105 may provide inmates with voice visitation services, video visitation services, email, online chats and/or text messaging services. In certain embodiments, the communications processing system 105 may alternatively or additionally provided various messaging capabilities by which residents of a controlled-environment facility may record voice and/or video messages that are made available to non-residents.

In some scenarios, such as the embodiment illustrated in FIG. 1, communications processing system 105 may be co-located within a controlled-environment facility 110. Alternatively, communications processing system 105 may be centrally and/or remotely located with respect to one or more controlled-environment facilities. Whether co-located or located remotely, communications processing system 105 may be used to provide communication services to inmates of multiple controlled-environment facilities. As described with respect to FIG. 5, in various embodiments, communications processing system 105 may assume a variety of forms.

In certain embodiments, residents of a controlled-environment facility 110 may use conventional telephones 115 to access certain voice communication services provided by the communications processing system 105. In various scenarios, access to conventional telephones 115 may be provided only to certain residents and/or in certain visitation areas provided by the controlled-environment facility 110. In certain embodiments, certain voice calls by staff of the controlled-environment facility 110 may be conducted using conventional telephones 115 that also utilize the communications processing system 105.

In many embodiments, the communications processing system 105 may provide residents of the controlled-environment facility 110 with voice, video and/or text messaging communications services using a resident communications terminal 120. In certain scenarios, the resident communications terminal 120 may be mounted on a wall, within a booth, or as part of kiosk. In certain scenarios, the resident communications terminal 120 may be a hardened terminal and may be installed in an area of the controlled-environment facility 110 dedicated to providing residents with visitation sessions. In certain embodiments, resident communications terminal 120 may provide a resident with the ability to participate in voice calls and to participate in video visitation sessions. As described in additional detail below, the resident communications terminal 120 may allow residents to record messages for non-residents and to receive responsive reply messages from non-residents. In certain embodiments, resident communications terminal 120 may include a character-entry interface that allows residents to participate in text message or similar communication services. In certain embodiments, such a resident communications terminal 120 may be referred to as an Intelligent Facility Device (IFD), which may be a video phone particularly adapted for use in a controlled-environment facility. An IFD may be adapted to provide residents with various additional services, such as commissary and account management, in addition to voice, video and/or text communications sessions.

In various embodiments, a resident communications terminal 120 may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident communications terminal 120 may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a speaker), a handle portion, and a mouthpiece portion (with a microphone). In certain embodiments, the resident communications terminal 120 may allow a resident to utilize a headset with earphones and a microphone in place of a traditional handset.

Resident communications terminal 120 may be configured to capture audio from the resident and to transmit the captured audio to a non-resident via the communications processing system 105. The resident audio may be captured using a microphone in the mouthpiece portion of the handset, a microphone installed within the enclosure of the terminal, or by a microphone component of a headset. During a voice visitation session, the resident communications terminal 120 receives an audio signal from the non-resident, via the communications processing system 105, and plays the received audio for the resident using the earpiece portion of the handset. During a video visitation session, resident communications terminal 120 may be configured to capture video or images of the resident using the camera and, via the communications processing system 105, transmit the captured video or images to a non-resident. As described below, residents may utilize the resident communications terminals 120 to record text, voice and/or video messages to be made available to one or more non-residents. Resident communications terminals 120 may be further configured to play voice messages recorded by non-resident in reply to the messages recorded by residents.

In certain embodiments, the communications processing system 105 may provide residents of the controlled-environment facility 110 with communication services using a portable communications device 125. In certain embodiments, portable communications device 125 may be a personal wireless device, such as a tablet computing device or smartphone device. As with the resident communications terminal 120, the portable communications device 125 may likewise include a camera, display, microphone and speakers and may be used both for voice visitation sessions and video visitation sessions. In certain scenarios, a portable communications device 125 may be referred to as an Intelligent Resident Device (IRD), or in a correctional institution environment, as an Intelligent Inmate Device (IID). In certain scenarios, a portable communications device 125 and/or a resident communications terminal 120 may be sponsored, or otherwise subsidized, by organizations or companies that have contracted with the controlled-environment facility 110 to provide communication services to residents of the facility.

In many scenarios, the portable communications device 125 may be especially adapted for use in controlled-environment facility. For instance, in a correctional facility, the portability of a portable communications device 125 may be limited by mounting the device on a wall, within a booth or as part of a kiosk. In certain scenarios, the portable communications device 125 may be protected within a hardened case that prevents any modifications to the hardware of the device. Various features of the hardware and/or software of the portable communications device 125 may be modified in order to prevent unauthorized use of the device. For instance, in a correctional institution, a portable communications device 125 may operate using a specially adapted operating system or operating system kernel. A portable communications device 125 may also be restricted with respect to the allowed software applications that may be used by a resident. The portable communications device 125 may also be configured to prevent the resident from installing or modifying any applications on the device, thus limiting the resident to the use of software programs authorized for use by the controlled-environment facility 110. The portable communication device 125 may be assigned for use by a resident on a temporary or permanent basis.

In various scenarios, a portable communications device 125 and/or a resident communications terminal 120 may provide a resident of the controlled-environment facility 110 with access to various software applications and services in addition to providing voice and video visitation sessions. For example, residents may be provided with legal research services, education services, employment search services, supervised email access, supervised online chat sessions, applications for playback of approved music and video files and/or supervised messaging. In certain scenarios, a portable communications device 125 and/or a resident communications terminal 120 may provide a resident with access to commissary services provided by the controlled-environment facility 110. In certain scenarios, portable communications device 125 and/or a resident communications terminal 120 may include a web browser which may be limited to only accessing secure websites and/or third party websites of approved vendors. Portable communications device 125 and/or a resident communications terminal 120 may also provide residents with access to various services specific to the controlled-environment facility 110, such as requesting a scheduled visitation session and requesting medical appointments.

A portable communications device 125 may also be restricted with respect to the network connectivity that is afforded to a resident of the controlled-environment facility. In many scenarios, a portable communications device 125 may be configured to connect only to a network provided by the controlled-environment facility 110. A portable communications device 125 may be further restricted to only connect to networks available within certain areas within a controlled-environment facility 110, such as a dedicated visitation area or other supervised area. In certain scenarios, network connectivity for a portable communications device 125 may be limited by placing wireless access points and positioning directional antenna within the physical structure of the controlled-environment facility 110 such that the generated wireless signals are restricted to limited areas within the facility.

In many scenarios, use of a resident communications terminal 120 and a portable communications device 125 is limited based on security protocols implemented by the controlled-environment facility 110. For instance, a resident may be required to enter a Personal Identification Number (PIN) before being allowed to use a resident communications terminal 120 or a portable communications device 125. A resident may similarly be required to provide biometric verification, such as using a voice print, fingerprint, facial recognition, iris scan or other biometric indicator. Access to specific applications and services provided by a resident communications terminal 120 and a portable communications device 125 may also be limited to residents based on security protocols, thus requiring addition verification, such as a password, prior to allowing access to a resident.

In the illustrated embodiment, the communications processing system 105 utilizes the administration and management system 165 in enforcing security protocols that are applicable to the use of communication services provided to residents of the controlled-environment facility 110. For instance, in providing visitation services, communication processing system 105 may limit a resident's visitation sessions to sessions with non-residents whose identities are listed in that resident's Pre-Approved Contact (PAC) and/or Personal-Allowed Number (PAN) list. In some scenarios, the communications processing system 105 may also enforce restrictions prohibiting a resident from contacting certain individuals identified in a "do not contact" list. In various scenarios, the identity of a non-resident may be identified based on the phone number of the non-resident, the device presented for use by a non-resident and/or the email addresses or other accounts used by the non-resident. Each resident's PAC, PAN, and/or do not contact list(s) may be stored, for example, in database 160 maintained by the administration and management system 165. In certain scenarios, database 160 may also be used to store biometric information used to authenticate individual residents of the controlled-environment facility 110. In addition to PAC, PAN, and/or do not contact list(s), administration and management system 165 may also store other security profiles and rules that are applicable to each resident.

The administration and management system 165 may also include a resident account management system 170 that is used to manage information such as balances in a resident's trust, commissary and/or calling accounts. The resident account management system 170 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the account management system 170 may be one or more separate systems, or may be integrated as a component of the administration and management system 165.

Using the communication services provided by the communication processing system 105, a resident may establish a communication session with one or more non-residents. In certain scenarios, a resident may call a non-resident that is using a telephone 130 or other communication device via a Publicly Switched Telephone Network (PSTN) 135. In the illustrated embodiment of the communication processing system 105, switch 140 may be used to connect voice visitation sessions with resident telephones 130 utilizing the PSTN 135. Additionally or alternatively, the non-resident may establish a text, voice and/or video visitation session with a resident that is using a personal communication device 145*a-c*, which may be a mobile phone 145*b*, tablet computing device 145*a*, a personal computer 145*c* or other communication device. A communications session with a resident using a personal communication device 145*a-c* may be connected through a network 150 such as an Integrated Services Digital Network (ISDN), Voice-over-IP (VoIP) network, or packet data network (such as, for example the Internet) and/or a wireless communications network. Router 155 of communication processing system 105 may be used to route data packets associated with a communication session with personal communication device 145a-c. In certain scenarios, the personal communication device 145a-c used by the non-resident may include a camera, a display, a microphone and speaker, thus allowing the non-resident to participate in either voice or video communication sessions with a resident of the controlled-environment facility 110, including recording voice and/or video messages for non-residents. As described in further detail below, non-residents may utilize a personal communication devices 145a-c to reply to recorded messages received from residents.

In some implementations, communication processing system 105 may be configured to perform various monitoring operations related to communication sessions. For instance, communications processing system 105 may be configured to allow staff to monitor live voice and video communications sessions. In addition, communications processing system 105 may record communication sessions, such as by generating audio and/or video files of the communications session. These recorded communications sessions may be stored to the database 160 maintained by the administration and management system 165. In certain embodiments, communications processing system 105 may provide access to various tools that can be used to search and analyze the recorded communications sessions in support of investigative activities.

In the illustrated embodiment, the communications processing system 105 includes a message service 175 that provides residents with messaging services according to various embodiments. As described, a resident may utilize the communication processing system 105 to request a communications session with a non-resident. In situations where a resident initiates a call request to a non-resident and the non-resident is unable to take the call, the message service 175 may provide residents with the ability to record a voice, video or text message to be made available to the non-resident. The message service 175 then provides the non-resident with the ability to retrieve the recorded message. In particular, the message service 175 dispatches a message to the communication device used by the non-resident, where this message directs the non-resident to the recorded message such that the message can be retrieved and played by the non-resident. As described in further detail below, the message service 175 may also allow a non-resident to respond to recorded messages via reply messages, such as text messages, video messages and voice messages.

In the embodiment of FIG. 1, the message service 175 is a component of the communication processing system 105. In certain embodiments, the message service 175 may be an external component of the communications processing system 105. One such embodiment is described with respect to FIG. 2. In certain embodiments, one or more of the functions of the message service 175 may be provided by systems external to the communication processing system 105. In certain of such embodiments, one or more of the functions of the message service 175 may be provided by centralized systems external to the controlled-environment facility 110.

In the embodiment of FIG. 2, the message service 210 provides similar functions as described with respect to the message service 175 of FIG. 1. In the embodiment illustrated in FIG. 2, the message service 210 is external to the communications system 205. In the illustrated embodiment, the message service 210 is comprised of several components that interoperate to provide the described messaging capabilities. In various embodiments, one or more components of the message service 210 may rely on external systems to provide the described functionality. In certain embodiments, various aspects of the functionality of the components of the message service 210 may be provided by other components of the communication system 205.

In the illustrated embodiment, the message service 210 interfaces with a visitation request system 225 of the communications system 205. The visitation request system 225 receives and processes communications session requests, such as requests for a text, voice and/or video communications session. In certain embodiments, the visitation request system 225 may receive and process communications requests issued by residents and request issued by non-residents. In the illustrated embodiment, the visitation request system 225 receives communications session requests from a resident using a resident communications device 215 that is similar to the resident communications terminal 120 of FIG. 1. In other embodiments, the communications session request may be received by the visitation request system 225 from any type of communication device capable of allowing a resident to participate in communications sessions provided via the communications system 205. For instance, in certain embodiments, resident communications device 215 may be a device such as the resident tablet device 125 or conventional telephone 115 described with regard to FIG. 1.

In the embodiment of FIG. 1, a communications session request is received from the resident communications device 215 by components of the communication system 205. The visitation request system 225 evaluates the request and determines whether the requested visitation is allowed, such as described with respect to FIG. 1. If the requested visitation between the resident and the non-resident is determined to be allowed, the visitation request system 225, in conjunction with other components of the communication system 205, issues a communications request to the non-resident on behalf of the resident using the resident communications device 215. In certain embodiments, the resident may be placed on hold while the visitation request system 225 connects the non-resident and attempts to notify the non-resident of the requested communications session.

If the visitation request system 225 determines that the communications request to the non-resident is not answered or is otherwise not accepted by the non-resident, the visitation request system 225 may forward the resident's communications request to the message service 210. The message recording engine 230 of the message service 210 may then allow the resident to continue using the resident communications device 215 to create or record a message for the non-resident to retrieve and/or play. In certain embodiments, a resident will only be provided the opportunity to record a message upon a determination that the resident is authorized to utilize the message service 210, for instance based on a security classification associated with the non-resident. If the resident is allowed to use the message service 210 and chooses to record a message, the message recording engine 230 captures the resident's text message, voice message or video message and stores the message to a repository 220. In certain embodiments, messages may be stored free of charge in the repository 220 for a limited amount of time. By payment of a storage fee, the storage time for a message may be extended. In certain embodiments, payment of a storage fee may be required in order for the non-resident to access and play a stored message recorded by a resident.

The embodiment of FIG. 2 utilizes a monitoring service 225 for the review and analysis of messages recorded or created by residents. As described with respect to the monitoring of communications sessions described with regard to FIG. 1, recorded message may similarly be screened by monitoring service 225 for indicators of unauthorized activity, such as coordinating the delivery of contraband, witness tampering and intimidation, and participating in gang activity. Monitoring service 225 may utilize a variety of techniques for screening recorded messages. For instance, monitoring service 225 may utilize speech recognition to convert voice messages to text in order to scan the message for keywords indicative of suspicious activity. Monitoring service 225 may also analyze recorded messages utilizing periodic or continuous voice print matching to identify situations where a resident recording a message has been illicitly joined by another resident that is also speaking as part of the recorded message.

In certain embodiments, recorded messages may include potentially suspicious activity, but may nonetheless be made available to the intended non-resident. In such embodiments, the recorded messages may be flagged as potentially including unauthorized activity. As described with respect to FIG. 4, reply messages by non-residents recorded in response to a message that has been flagged as potentially suspicious may be subjected to additional analysis in order to discern unauthorized activity within a message and a resulting reply message.

Upon the resident recording or creating a message for a non-resident and the recorded message being released by the monitoring service 225, the message service 210 may utilize a notification engine 240 to generate and dispatch a notification of the message to the non-resident. In certain embodiments, the notification engine 240 may rely on an external service in delivering notifications to the non-resident. The notification may include a link or other resource locator that directs the non-resident to a website by which the message recorded by the resident can be retrieved and played by the non-resident. In various embodiments, the notification may also include information that identifies the resident that recorded or created the message. In such embodiments, the notification engine 240 may obtain information identifying the resident via the communications system 205 and may include certain of such identifying information in the notification.

In certain embodiments, the notification delivered to the non-resident directs the non-resident to the message service 210 for retrieval of the recorded message. In certain of such embodiments, the message service 210 may first direct the non-resident to a payment system 245. In scenarios where payment is required in order to play a stored message, the payment system 245 receives payment from the non-resident and the repository 220 is updated to indicate the payment of a storage fee associated with the stored message. In certain embodiments, portions of the payment system 245 may be implemented using external systems, such as payment processing systems.

If payment is received or the message service 210 otherwise approves, the message service 210 authorizes a message retrieval engine 250 to retrieve the recorded or created message from repository 220 and to provide the message for playback by the non-resident. In certain embodiments, the message retrieval engine 250 may provide the device utilized by the non-resident with temporary credentials that can be used to access the repository 220 directly in order to play the recorded message. In certain embodiments, playback of a message by the message retrieval engine 250 may be indicated in the repository 220 in order to track whether a recorded message has been accessed and played by its intended recipient.

As described in additional detail with respect to FIG. 4, the reply message manager 235 may be used to provide the non-resident with an opportunity to provide a message in reply to the message from the resident. Upon the non-resident playing a recorded message from a resident, the reply message manager 235 may prompt the non-resident with an option to record a brief reply message, such as a text message or a short voice message, or video message for delivery to the resident. The reply message manager 235 may rely on the message recording engine 230 for the recording of a reply message from the non-resident and may also rely on payment system 245 to obtain payment from a recipient for a reply message. Once a reply message has been recorded, the messaging service 210 may utilize the notification engine 240 to notify of the recipient of the reply message.

FIG. 3 is a flowchart diagram providing certain steps of a process according to various embodiments, where the process provides a resident of a controlled-environment facility with the ability to record a message for retrieval and playback by a non-resident. The process begins at step 305 with the resident initiating the communications request. Depending on the type of communication device being used by the resident and the policies of the controlled-environment facility, the identity of the resident may require confirmation, for instance using a PIN or using voice print, fingerprint, facial recognition, iris scan or other biometric identifiers, in order to issue a communications request. The resident may then issue a communications request via a system such as communications system 105, 205 described with respect to FIGS. 1 and 2. In certain embodiments, certain of these functions in receiving and processing communications session requests may be implemented by the visitation request system 175, 225 described with respect to FIGS. 1 and 2, respectively.

At step 310, the communications system may prompt the resident for the identity of the non-resident with which the resident seeks a communications session. In certain embodiments, the resident may be provided with an interface allowing the selection of contact information for one or more non-residents that have been approved to participate in communications sessions with the resident, such as via the PAN and PAC lists described with respect to FIG. 1. The communication system may also verify that the resident is not prohibited from contacting the identified non-resident. In certain scenarios, the resident may be required to provide a phone number for the non-resident. In certain scenarios, manual assistance may be provided to the resident in identifying contact information for the non-resident. Upon providing the communication system with contact information for the non-resident, the resident may be placed on hold while the communications request is initiated. In certain embodiments, the resident is transferred to a conference bridge, to which the non-resident will be transferred if the communications request is accepted.

With the resident on hold, a communications session request to the non-resident is initiated at step 315 using the contact information specified by the resident. In certain embodiments, a communications request is made by visitation request system 175, 225 described with respect to FIGS. 1 and 2, respectively. In certain of such embodiments, the visitation request system dials a phone number associated with the non-resident and waits for an answer. If, at step 320, the non-resident's communication device associated with the phone number is used to accept the communications session request, at step 325, the requested communications session is conducted, in some cases by transferring the non-resident to the conference bridge where the resident remains holding.

If no answer to the dialed call is received before the expiration of a pre-determined time interval, at step 320, the communications session request is determined as being unanswered and thus not accepted by the non-resident. The time interval may be selected as sufficiently short in duration in order to prevent any voicemail system of the non-resident from answering the communications session request. In certain scenarios, the non-resident may answer the communications session request, but decline to participate in the requested communications session.

In certain embodiments, the visitation request system may utilize an Interactive Voice Response (IVR) system for relaying the communications session request to a non-resident and determining whether the non-resident chooses to accept the communications session request. For instance, the IVR system may be used to notify the non-resident regarding the identity of the resident issuing the communications session request and the controlled-environment facility in which the resident is being detained. If the non-resident answers the communications request call, the IVR system may be used to determine whether the non-resident has elected to decline the communications request.

If the resident does not answer or otherwise declines the communications session request, at step 330, the message service determines whether the resident is authorized to record a message for the non-resident. Certain embodiments may limit a resident's ability to utilize the message service for recording messages based on a privilege status classification associated with the resident. If the resident is authorized, at step 340, the resident may be provided with the opportunity to record a message that will be made available to the non-resident. In certain scenarios, the message service provides the resident with instructions pertaining to recording a message for the non-resident. In certain embodiments, the message recorded by the resident is an audio message, similar to a voice mail message. In other embodiments, the resident may be allowed to record a video message or text message for a non-resident. Prior to allowing the resident to record a message for a non-resident, the message service may inform the resident that the message may be recorded and monitored and that any reply messages from the non-resident may be likewise recorded and monitored.

Once recorded, at step 345, the message service may utilize various other components of the communication system, such as speech processing and keyword detection tools, to analyze the recorded text, audio and/or video in order to identify any illicit activities or other unauthorized or suspicious use of the provided communications services. In certain scenarios, the message recorded by the resident may be limited in duration based on various factors, such as whether the cost for the message is being paid by the resident or will be paid by the non-resident upon choosing to play the message. The duration of the recorded messages may also be limited based on various restrictions, such as a privilege status of the resident. As described with respect to FIG. 4, the message service may allow the non-resident to play the message from the resident and to record a reply message, which may be analyzed in conjunction with the resident's message in search of illicit or suspicious activity within the pair of messages. As described with respect to FIG. 3, certain embodiments may flag certain messages as potentially suspicious based on this analysis, in which case the recorded messages may nonetheless be made available to a non-resident, but any reply message from the resident may be subject to additional scrutiny by the monitoring and investigative techniques utilized by the controlled-environment facility.

Once a message is recorded and analyzed, at step 350, the message service notifies the non-resident of the recorded message. As described with respect to FIG. 2, the message service may utilize various notification mechanisms, such as voicemails, video message notification, text messages, push notifications and/or emails, in order to notify a non-resident of the message and to provide the non-resident with instructions for retrieving and playing the recorded message. The message may also include information in the notification that identifies the resident that recorded the message and contact information for the controlled-environment facility in which the resident is located.

Once a message has been recorded by a resident and a notification has been sent to the non-resident, the process may continue in certain embodiments with the process of FIG. 4, by which the message service may provide a non-resident with the ability to play a recorded message and to record a reply message in response to the resident. Certain embodiments may continue at step 405 with the non-resident agreeing to receiving the message recorded by the resident. As described, upon the recording of a message by the resident, the non-resident may be notified of the message, where the notification may include a link that directs the non-resident to the stored message. In certain embodiments, the link may direct the non-resident to a web site by which the recorded message may be retrieved and played, in some cases for a fee. In certain of such embodiments, the website may implement security measures for authenticating the individual seeking access to the recorded message as the non-resident that is the intended recipient of the message.

In certain embodiments, the message service may utilize various functions of the communications system 205 and/or monitoring service 255 in order to confirm the identity of the non-resident seeking to retrieve and play a recorded message. In many controlled-environment facilities, residents may be prohibited from contacting certain individuals. In light of such concerns, various forms of authentication may be required from the individual seeking access to a recorded message. In certain embodiments, a voice print of the non-resident may be captured and compared against authorized voice prints associated with non-residents that have been authorized to communicate with the resident. In certain embodiments, the authentication requirements for accessing a recorded message may be based on a privilege status of the resident. Low-risk residents may be allowed to send messages to anyone not listed in a do-not-contact list, while a high-risk resident may be allowed to send messages only to approved non-residents that can be positively authenticated using voice prints.

At step 410, the recorded message may be played for the non-resident. The message service may be configured to retrieve a recorded message based on an identifier encoded within the link by which the non-resident has accessed the message service. By selecting the link, a web browser of the device utilized by the non-resident, such as personal devices 145*a*-*c* of FIG. 1, may be directed to a website that provides non-residents with access to certain aspects of the message service. Once the message requested by a non-resident has been identified, the message may be played for the non-resident via capabilities supported by the web browser of the non-resident's device. A recorded voice message may be played for the non-resident via the audio capabilities supported by the web browser of the non-resident. A video message may be played for the non-resident via video capabilities supported by the non-resident's personal device, such as FLASH video supported by the web browser.

Upon playing the recorded message for the non-resident, at step 415, the non-resident is provided the opportunity to record a brief reply message for the non-resident. The non-resident may be notified of the option to record a reply message as part of the instructions provided to the non-resident prior to playing the recorded message from the resident. The non-resident may be prompted to record a reply message immediately upon the recorded message being played for the non-resident. By incorporating the reply message capability into the non-resident's retrieval and playing of the original message from the resident, the likelihood is increased that the non-resident will provide a reply message when compared to a system that requires a non-resident to independently contact the message service to leave a message for a resident. In addition, incorporating the reply message capability immediately after the playing of the original message improves the responsiveness of the reply message and reduces the duration of the message cycle between the resident and the non-resident.

At step 420, the non-resident may record a reply message to be made available to the resident. In various embodiments, the reply message may be a text message, a voice message or a video message. Prior to allowing the non-resident to record a reply message, the message service may inform the non-resident that the reply message may be recorded and monitored for illicit or unauthorized activity. The format of the reply message may be based on preferences specified by the non-resident. In certain embodiments, the format of the reply message may be determined based on a security classification associated with the resident. For instance, certain high-risk residents may be restricted to receiving reply messages that are in text message format. Other residents with fewer restrictions may be allowed to receive reply messages that are voice messages. Residents with the fewest restrictions may be allowed to receive video reply messages.

In certain embodiments, the format of the reply message may be determined based on the type of personal device being used by the non-resident. For instance, in scenarios where a non-resident is determined to be using a mobile phone in accessing the message service, the non-resident may be provided with the opportunity to provide a text message as a reply message. In scenarios where a non-resident is determined to be using a traditional telephone device without text or video capabilities, the non-resident may be provided the opportunity to provide a voice message as a reply message. In scenarios where the non-resident is determined to be using a personal computing device that supports video, such as a tablet, smartphone or laptop, the non-resident may be provided with the opportunity to provide a video message as a reply message.

In certain embodiments, the format of the reply message may be determined based on the time required to screen, approve and deliver the reply message. Such embodiments may seek to limit the format of reply messages to formats that can be screened and approved within a short time frame, thus ensuring the provided messaging capabilities are provided with an acceptably short message cycle. For instance, in certain scenarios, monitoring and screening video messages may take considerably longer than audio and text messages due to the human and technological investigative resources that are currently available to a controlled-environment facility. In such scenarios, a short messaging cycle may be maintained by limiting messaging to audio and text messaging.

As described, residents often face delays in receiving responses to messages delivered to non-residents. By shortening the messaging cycle between residents and non-residents, the residents have improved connections with the outside world, which tends to result in the residents being involved in fewer incidents within the controlled-environment facility. In order to shorten the message cycle, embodiments provide the ability for non-residents to provide immediate replies upon playing a message recorded by a resident. In general, the longer a message, the more time required to ensure no unauthorized activity is occurring within the message. Shorter messages thus generate a smaller monitoring burden, thus improving the ability to screen and deliver reply messages to residents more quickly, thus shortening the message cycle. Accordingly, certain embodiments may limit the length of reply messages that may be recorded by non-residents.

In certain embodiments, the length of a reply message that may be recorded by non-residents may be limited based on the format of the reply message. For instance, a text reply message may be restricted by a character limit. A voice reply message may be restricted to a brief duration that allows for a short message to be communicated, such as 120 seconds. A video reply message may be restricted to a shorter duration, such as 30 seconds, in light of the additional analysis that is required to determine whether potentially unauthorized activity is present in the audio and the images, either separately or in combination, that comprise a reply video message.

In certain embodiments, the length of reply messages that may be recorded by non-residents may be limited based on a security classification of the resident to which the non-resident is replying. For instance, when replying to a resident classified as a high-risk resident of a controlled-environment facility, a non-resident may be limited to a shorter character limit for text message replies and shorter durations for voice and video reply messages. When replying to a lower-risk resident, a non-resident may be allowed a larger character limit for text messages and longer durations for voice and video messages.

At step 425, the reply message may be analyzed for potentially unauthorized activity. As with the message recorded by the resident, the reply message may be analyzed using a variety of different techniques. For instance, a reply text message may be analyzed for keywords and/or for specific types of information deemed as potentially suspicious, such as date and time information or the names of staff or certain residents. The audio from a reply voice message or a reply video message may be converted to text and similarly analyzed. The images from a reply video message may be analyzed using image recognition that may include facial recognition capable of identifying participants with which a resident is not authorized to communicate.

In certain embodiments, the reply message may be analyzed for unauthorized activity based on whether the recorded message from the resident has been flagged as being potentially suspicious. As described with respect to step 345 of FIG. 3, the message recorded by a resident may be analyzed and, if indicators of unauthorized activity are identified in the recorded message, the message may be marked as being potentially suspicious. In certain embodiments, a reply message from a non-resident may be subjected to additional analysis at step 425 if the recorded message from the resident has been marked as suspicious. For instance, a reply to a message that has been marked as suspicious may be analyzed both for content, such as keywords, and may be compared against other reply messages in order to identify emerging patterns that may represent coded communications.

At step 430, the resident may be notified of the reply message recorded by the non-resident. These notifications may depend on the communications devices that are available to a particular resident. For instance, if a resident has been assigned use of a personal device, such as a tablet, notification of the reply message may be indicated on the login screen of the tablet. During use of the tablet by the resident, the notification may be issued by the operating system of the tablet. In scenarios where the resident only has access to a terminal device, such as the resident terminal 120 of FIG. 1, the resident may be required to log in to the terminal, such as by providing a PIN or by biometric identification, in order to receive a notification of any reply messages that have been received on behalf of the resident.

At step 435, the reply message may be played for the resident. In scenarios where the reply message is a text message it may be displayed via text display capabilities of the device in use by the resident. In scenarios where the resident is using a resident terminal, the reply text message may be displayed in the screen portion of the terminal. In scenarios where the reply message is a voice message, the audio may be played for the resident via the speaker of the device of the resident. In scenarios where the reply message is a video message it may be displayed via a video-capable device in use by the resident, such as a tablet device.

In this manner, residents and non-residents are provided with the ability to communicate with shorter delays and without requiring a live, interactive communications session that requires both parties to be available at the same time. As described, residents may be provided limited access to communications services and communications devices only during scheduled visitation times that may be strictly enforced. As such, the availability of a resident for a scheduled visitation may be significantly constrained. In order for a live visitation session to be conducted by a resident, the visitation schedule of the resident must coincide with the availability of the non-resident. By providing a capability for non-residents to respond immediately upon receipt of a message from a resident, these scheduling difficulties may be mitigated while also reducing the duration of the message cycle between the resident and the non-resident.

The above embodiments describe a reply messaging capability that records a message from a resident and provides the non-resident recipient of the message with the ability to record a reply message upon playing or reading the message from the resident. Certain embodiments may provide a similar reply messaging capability that allows residents to reply to messages received from non-residents. Certain controlled-environment facilities may utilize a messaging service that allows non-residents to record text, voice and/or video messages for retrieval by a resident. Upon accessing the recorded message, the resident may be provided with an opportunity to record a reply message, similar to the described non-resident reply messaging capabilities that have been described above. In certain embodiments, these reply capabilities may be provided to a resident in order to reply to a reply message that has been received from a non-resident in response to an original message from the resident.

FIG. 5 is a block diagram of a communication processing system 500 configured according to certain embodiments to support the described voice messaging system. Communication processing system 500 may include one or more processors 501. In various embodiments, communication processing system 500 may be a single-processor system including one processor 501, or a multi-processor system including two or more processors 501. Processor(s) 501 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communication processing system 500 includes a chipset 502 that may include one or more integrated circuits that are connected to processor(s) 501. In certain embodiments, the chipset 502 may utilize a QPI (QuickPath Interconnect) bus 503 for communicating with the processor(s) 501. Chipset 502 provides the processor(s) 501 with access to a variety of resources. For instance, chipset 502 provides access to system memory 505 over memory bus 504. System memory 505 may be configured to store program instructions and/or data accessible by processors(s) 501. In various embodiments, system memory 505 may be implemented using any suitable memory technology, such as static RAM (SRAM), synchronous dynamic RAM (SDRAM), nonvolatile/Flash-type memory, or any other type of memory.

Chipset 502 may also provide access to a graphics processor 507. In certain embodiments, graphics processor 507 may be comprised within one or more video or graphics cards that have been installed as components of the communication processing system 500. Graphics processor 507 may be coupled to the chipset 502 via a graphics bus 506 such as provided by an AGP (Accelerated Graphics Port) bus, a PCIe (Peripheral Component Interconnect Express) bus. In certain embodiments, graphics processor 507 generates display signals and provides them to a display device 108 that may be coupled directly to the communication processing system 500 or may be located remotely from the communication processing system 500.

In certain embodiments, chipset 502 may also provide access to one or more user input devices 511. In such embodiments, chipset 502 may be coupled to a super I/O controller 510 that provides interfaces for a variety of user input devices 511, in particular lower bandwidth and low data rate devices. For instance, super I/O controller 510 may provide access to a keyboard and mouse or other peripheral input devices. In certain embodiments, super I/O controller 510 may be used to interface with coupled user input devices 511 such as keypads, biometric scanning devices, and voice or optical recognition devices. The user input devices 511 may interface with super I/O controller 510 through wired or wireless connections. In certain embodiments, the super I/O controller 510 may be coupled to the super I/O controller 510 via a Low Pin Count (LPC) bus 513.

Other resources may also be coupled to the processor(s) 501 of the communication processing system 500 through the chipset 502. In certain embodiments, chipset 502 may be coupled to a network interface 509, such as provided by a Network Interface Controller (NIC) that is coupled to the communication processing system 500. In certain embodiments, the network interface 509 may be coupled to the chipset 502 via a PCIe bus. According to various embodiments, network interface 509 may support communication via various wired and/or wireless networks. Chipset 502 may also provide access to one or more hard disk and/or solid state drives 515. In certain embodiments, the chipset 502 may also provide access to one or more optical drives 514 or other removable-media drives. Any or all of the drive devices 514 and 515 may be integral to the communication processing system 500, or may be located remotely from the communication processing system 500. In certain embodiments, the chipset 502 may also provide access to one or more Universal Serial Bus (USB) ports 516.

In various embodiments, a communication processing system 500 does not include each of the components shown in FIG. 5. In various embodiments, a communication processing system 500 may include various additional components in addition to those that are shown in FIG. 5. Furthermore, some components that are represented as separate components in FIG. 5 may in certain embodiments instead be integrated with other components. For example, in certain embodiments, all or a portion of the functionality provided by the illustrated components may instead be provided by components integrated into the one or more processor(s) 501 as a systems-on-a-chip.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing a resident of a controlled-environment facility with messaging, the system comprising:
a visitation request system configured to:
initiate a communications request on behalf of the resident for a communications session with a non-resident; and
determine that the non-resident has not accepted the communications request; and
a message service configured to:
store a message recorded by the resident for the non-resident, in response to determining the communications request has not been accepted by the non-resident;
notify the non-resident that the recorded message from the resident is available from the message service;
in response to a request to access the recorded message from the non-resident, play the recorded message from the message service to the non-resident;
upon completing the playing of the recorded message, immediately prompting the non-resident to record a reply message in a format based on the type of device being used by the non-resident and providing the non-resident an opportunity to directly record the reply message on the message service; and
notify the resident of the recorded reply message from the non-resident;
wherein the recorded reply message is limited to a duration.

2. The system of claim 1, wherein the recorded reply message includes video content.

3. The system of claim 1, wherein the duration is determined based on a security classification associated with the resident.

4. The system of claim 1, wherein the system further includes a monitoring service configured to:
analyze the recorded messages from the resident to identify indicators of unauthorized activity by the resident; and
denote the recorded message as suspicious based on the identification of indicators of unauthorized activity by the resident.

5. The system of claim 4, wherein the monitoring service is further configured to analyze the reply message for indicators of unauthorized reply activity by the non-resident, if the recorded message is denoted as suspicious.

6. The system of claim 1, wherein the message service is further configured to:
receive a request from the resident to play the reply message from the non-resident, wherein the request is received from a resident device utilized by the resident; and
convert the reply message from a first format to a second format based on the capabilities of the resident device.

7. The system of claim 1, wherein the recorded reply message includes audio content.

8. A method for providing a resident of a controlled-environment facility with messaging, the method comprising:
initiating, on behalf of the resident, a communications request for a communications session with a non-resident;
determining that the non-resident has not accepted the communications request;
in response to determining the communications request has not been accepted by the non-resident, storing a message recorded by the resident for the non-resident;
notifying the non-resident that the recorded message from the resident is available from the message service;
in response to a request to access the recorded message from the non-resident, playing the recorded message from the message service to the non-resident;
upon completing the playing of the recorded message, prompting the non-resident to record a reply message and immediately providing the non-resident an opportunity for directly recording the reply message on the message service, wherein the recorded reply message is limited to a duration based on a security classification associated with the resident; and
notifying the resident of the recorded reply message from the non-resident.

9. The method of claim 8, wherein the recorded reply message includes video content.

10. The method of claim 8, wherein the duration limit is further based on the resident the format of the reply message.

11. The method of claim 8, further comprising:
analyzing the recorded messages from the resident to identify indicators of unauthorized activity by the resident; and
denoting the recorded message as suspicious based on the identification of indicators of unauthorized activity by the resident.

12. The method of claim 11, further comprising:
if the recorded message is denoted as suspicious, analyzing the reply message for indicators of unauthorized reply activity by the non-resident.

13. The method of claim 8, further comprising:
receiving a request from the resident to play the reply message from the non-resident, wherein the request is received from a resident device utilized by the resident; and
converting the reply message from a first format to a second format based on the capabilities of the resident device.

14. A computer-readable storage device having program instructions stored thereon for providing a resident of a controlled-environment facility with messaging, upon execution by one or more processors, the program instructions cause the one or more processors to:
initiate, on behalf of the resident, a communications request for a communications session with a non-resident;
determine that the non-resident has not accepted the communications request;
in response to determining the communications request has not been accepted by the non-resident, store a message recorded on the message service by the resident for the non-resident;
notify the non-resident that the recorded message from the resident is available from the message service;
in response to a request to access the recorded message from the non-resident, play the recorded message from the message service to the non-resident;
upon completing the playing of the recorded message, prompting the non-resident to record a reply message and immediately providing the non-resident an opportunity to directly record the reply message on the message service; and
notify the resident of the recorded reply message from the non-resident;
wherein the recorded reply message is limited to a duration based on a security classification associated with the resident.

15. The computer-readable storage device of claim 14, wherein the recorded reply message includes video content.

16. The computer-readable storage device of claim 14, wherein the duration limit is further based on the format of the reply message.

17. The computer-readable storage device of claim 14, the program instructions further causing the one or more processors to:
analyze the recorded messages from the resident to identify indicators of unauthorized activity by the resident;
denote the recorded message as suspicious based on the identification of indicators of unauthorized activity by the resident.

18. The computer-readable storage device of claim 17, the program instructions further causing the one or more processors to: analyze the reply message for indicators of unauthorized reply activity by the non-resident, if the recorded message is denoted as suspicious.

19. The computer-readable storage device of claim 14, the program instructions further causing the one or more processors to:
receive a request from the resident to play the reply message from the non-resident, wherein the request is received from a resident device utilized by the resident; and
convert the reply message from a first format to a second format based on the capabilities of the resident device.

20. The computer-readable storage device of claim 19, wherein the first format is a text message format and the second format is an audio message format.

* * * * *